US011621563B2

(12) United States Patent
Parish

(10) Patent No.: US 11,621,563 B2
(45) Date of Patent: Apr. 4, 2023

(54) SYSTEM FOR DYNAMIC DEMAND BALANCING IN ENERGY NETWORKS

(71) Applicant: BRITISH GAS TRADING LIMITED, Windsor (GB)

(72) Inventor: David Parish, Windsor (GB)

(73) Assignee: British Gas Trading Limited, Windsor (GB)

(*) Notice: Subject to any disclaimer, the term of this patent is extended or adjusted under 35 U.S.C. 154(b) by 362 days.

(21) Appl. No.: 16/637,318

(22) PCT Filed: Aug. 7, 2018

(86) PCT No.: PCT/GB2018/052247
§ 371 (c)(1),
(2) Date: Feb. 7, 2020

(87) PCT Pub. No.: WO2019/030511
PCT Pub. Date: Feb. 14, 2019

(65) Prior Publication Data
US 2020/0235576 A1    Jul. 23, 2020

(30) Foreign Application Priority Data
Aug. 8, 2017  (GB) ...................................... 1712727

(51) Int. Cl.
*G05B 15/02* (2006.01)
*H02J 3/38* (2006.01)
(Continued)

(52) U.S. Cl.
CPC .............. *H02J 3/381* (2013.01); *G05B 15/02* (2013.01); *H02J 3/14* (2013.01); *H02J 3/466* (2020.01);
(Continued)

(58) Field of Classification Search
CPC ...... H02J 3/14; H02J 3/381; H02J 3/46; H02J 13/00006; H02J 2300/28; H02J 2300/22; G05B 15/02
See application file for complete search history.

(56) References Cited

U.S. PATENT DOCUMENTS

2002/0162032 A1\* 10/2002 Gundersen .......... H02J 13/0086
713/300
2004/0095237 A1\* 5/2004 Chen ................... G06F 11/0772
340/506
(Continued)

FOREIGN PATENT DOCUMENTS

EP        3010108 A1    4/2016
WO    2015/103677 A1    7/2015
(Continued)

OTHER PUBLICATIONS

International Search Report and Written Opinion issued by the International Searching Authority (ISA/US) in PCT Application No. PCT/GB2018/052247 dated Oct. 16, 2018. 12 pages.
(Continued)

*Primary Examiner* — Gary Collins
(74) *Attorney, Agent, or Firm* — Meunier Carlin & Curfman LLC

(57) ABSTRACT

A method of controlling energy supply in an energy distribution network is disclosed. The energy distribution network comprises an energy generation facility adapted to supply energy to the energy distribution network and an energy consumer adapted to consume energy from the energy distribution network. The method comprises, at the energy generation facility: detecting a curtailment condition, the curtailment condition indicating that the energy generation facility should curtail its supply of energy to the energy distribution network; in response to the curtailment condition, transmitting, via a communications link, a request to
(Continued)

increase energy consumption to the energy consumer; receiving a reply message from the energy consumer via the communications link; and controlling energy output from the generation facility in dependence on the reply message.

19 Claims, 7 Drawing Sheets

(51) Int. Cl.
H02J 3/14 (2006.01)
H02J 3/46 (2006.01)
H02J 13/00 (2006.01)

(52) U.S. Cl.
CPC ... H02J 13/00004 (2020.01); H02J 13/00006 (2020.01); H02J 13/00028 (2020.01); H02J 2300/22 (2020.01); H02J 2300/28 (2020.01)

(56) References Cited

U.S. PATENT DOCUMENTS

| | | | |
|---|---|---|---|
| 2007/0001461 A1* | 1/2007 | Hopewell | H02J 3/383 290/44 |
| 2010/0191996 A1 | 7/2010 | Iino et al. | |
| 2011/0001356 A1* | 1/2011 | Pollack | B60L 53/665 307/31 |
| 2011/0184581 A1* | 7/2011 | Storch | G06Q 50/06 700/295 |
| 2012/0065805 A1* | 3/2012 | Montalvo | G06Q 10/06 700/297 |
| 2013/0217409 A1 | 8/2013 | Bridges et al. | |
| 2013/0285446 A1* | 10/2013 | Chow | H02J 3/32 307/18 |
| 2015/0018985 A1* | 1/2015 | Koch | H02J 3/00 700/90 |
| 2015/0112501 A1* | 4/2015 | Rombouts | H02J 3/14 700/295 |
| 2015/0276253 A1 | 10/2015 | Montalvo | |

FOREIGN PATENT DOCUMENTS

WO 2016/004432 A1 1/2016
WO 2016/167722 A1 10/2016

OTHER PUBLICATIONS

Combined Search and Examination Report issued by the UK Intellectual Property Office in Application No. GB1712727.5 dated Oct. 6, 2017. 5 pages.
National Grid: Demand Turn Up 2016. Dec. 1, 2016. 16 pages.
Muller, Theresa. The role of demand side management for the system integration of renewable energies. 14th International Conference on the European Energy Market (EEM). Jun. 6, 2017. 6 pages.

* cited by examiner

SYSTEM FOR DYNAMIC DEMAND BALANCING IN ENERGY NETWORKS

CROSS-REFERENCE TO RELATED APPLICATIONS

This application is a national stage application filed under 35 U.S.C. § 371 of PCT/GB2018/052247 filed Aug. 7, 2018, which claims the benefit of and priority to GB Patent Application No. 1712727.5 filed on Aug. 8, 2017, the disclosure of which is expressly incorporated herein by reference in its entirety.

The present invention relates to systems and methods for balancing energy demand and energy generation in energy distribution networks, in particular electricity distribution networks. We describe the present invention with reference to the energy networks of the UK, including specific regions of the UK. However it is understood that the present invention can be applied to other energy networks and is not limited to the UK.

Electricity distribution networks were traditionally geared toward downward distribution from a small number of large generating sites (e.g. coal-fired or nuclear power stations) to large numbers of consumer sites (e.g. houses, office buildings, factories).

In recent decades, the demand for renewable energy has been met by more widely distributed, smaller generation sites, such as wind turbines, solar installations and the like. This presents opportunities for smaller organisations to create energy generation installations on a smaller scale and sell generated energy (or any surplus, where generation is principally for the organisation's own use) into the grid. However the distribution girds are designed for downward flow, not distributed generation, and this places significant constraints on the distribution network. Also, there may be a desire to generate energy in regions where sources of renewable energy are plentiful and export that energy to other regions, but existing networks are typically not engineered to support large-scale energy export between regions. This limits growth of renewable energy generation in a region to local demand and to what the local grid can support.

In the UK, the core high voltage transmission network connects to smaller lower-voltage distribution network operators (DNOs) serving particular regions. DNOs are charged with providing two-way connections to the network to allow localised generation. Generally, providers want to be able support the installation of standalone generation assets, allowing generation to meet local demand whilst enabling export of surplus energy. The main current solution is to provide private higher-capacity grid connections to such providers but this typically involves major infrastructure upgrades.

Due to network limitations, measures are needed to ensure the distribution network does not become overloaded. For example, curtailment policies may be applied to generation sites, to curtail generation during times of high supply in the network generally. This, however, makes installation of such small-scale facilities less attractive, and moreover reduces the utilisation of renewable energy.

The present invention therefore seeks to provide improved techniques for managing distributed energy generation and consumption in energy distribution networks.

Accordingly, in a first aspect of the invention, there is provided a method of controlling energy supply in an energy distribution network comprising an energy generation facility adapted to supply energy to the energy distribution network and an energy consumer adapted to consume energy from the energy distribution network, the method comprising, at the energy generation facility: detecting a curtailment condition, the curtailment condition indicating that the energy generation facility should curtail its supply of energy to the energy distribution network; in response to the curtailment condition, transmitting, via a communications link, a request to increase energy consumption to the energy consumer; receiving a reply message from the energy consumer via the communications link; and controlling energy output from the generation facility in dependence on the reply message.

By sending a request to a connected consumer to increase consumption in response to a curtailment condition, the need for curtailment of energy output from the generation facility may be reduced or eliminated altogether, thereby enabling better utilisation of the generation facility.

The energy generation facility may comprise any form of generation apparatus, machine, or other entity, and may include a single generator or multiple generators (of the same or different types), preferably located at a single site and/or operating together to provide output to the distribution network (e.g. via a shared connection to the network). Similarly, the term "energy consumer" may encompass any site, building (or part thereof), apparatus, machine, or any other entity adapted to consume energy from the energy distribution network, or any collection of such entities preferably located at a single site and operating together to consume energy from the energy distribution network (e.g. through a shared connection to the network).

Except where required otherwise by context, references to "energy", "energy consumption", "energy output" and the like may include energy in any distributable form (e.g. electricity, fuel etc.) and measured in accordance with any appropriate unit of measurement (for example as energy values in Joule, as energy consumption/output/flow rates in Watt, as energy fuel quantities or fuel consumption/output/flow rates, e.g. fuel mass or volume, or fuel mass or volume per unit time etc.) Thus a measured or specified energy output or energy consumption (or increase/decrease/difference therein) may be specified as an energy output rate or energy consumption rate.

Controlling energy output preferably comprises curtailing energy output from the generation facility. The term "curtail" as used herein preferably refers to restricting energy supply, including by reducing energy supply (e.g. continuing energy output at a lower output level compared to the energy output prior to detection of the curtailment condition) or by terminating energy output to the distribution network (i.e. reducing supply to zero).

Curtailing energy output may comprise reducing an output power of the generation facility.

Preferably, curtailing energy output comprises sending control data to reduce energy output to an export limiter coupled between the generation facility and the distribution network.

The controlling step may comprise determining whether, and optionally to what extent (e.g. by what amount), to curtail energy output from the generation facility in dependence on the reply message, and controlling energy output based on the determination.

The controlling step may comprise continuing energy output without curtailment in response to the reply message indicating that the energy consumer has increased its energy consumption. Thus, curtailment of generation can be avoided in some cases. The controlling step may comprise continuing energy output without curtailment in response to the reply message indicating that the energy consumer has increased its energy consumption by at least a predetermined or specified amount. The specified amount may be specified in the request (e.g. as a requested power increase). Thus, curtailment may be avoided if the consumer is able to increase its consumption by the requested amount. Continuing energy output without curtailment preferably comprises allowing a full output from the generation facility to flow to the distribution network (e.g. by not taking any control actions to restrict energy output). Continuing energy output may comprise continuing energy output substantially at a level corresponding to the output level immediately preceding detection of the curtailment condition.

The method preferably further comprises curtailing energy output from the generation facility in response to the reply message indicating that the energy consumer has not increased its consumption, or has increased its consumption by less than a requested or expected increase. The controlling step preferably comprises curtailing energy output by an amount dependent on an increase in energy consumption achieved by the energy consumer. The amount may be specified (e.g. as a power increase value) in the reply message.

An increase in energy consumption (e.g. a requested or achieved increase) may be specified in the request and/or reply message with respect to a predetermined demand level or demand profile associated with the energy consumer.

Preferably, detecting the curtailment condition comprises receiving a curtailment request message from a control system associated with the energy distribution network. Alternatively or in addition, detecting the curtailment condition may comprise determining a time at which curtailment should be implemented based on a curtailment schedule.

The method may optionally comprise, in response to the curtailment condition, transmitting requests to increase energy consumption to a plurality of energy consumers (where each energy consumer is connected to the distribution network and is able to vary its energy consumption on request). The controlling step may then comprise controlling energy output from the generation facility based on an aggregate consumption increase achieved by the plurality of energy consumers responsive to the requests (e.g. as reported by the consumers in respective reply messages), for example by curtailing its energy output by a given amount and/or not curtailing its energy output depending on a total achieved consumption increase.

The method may comprise, at the (or each) energy consumer: receiving the request; attempting to increase energy consumption (e.g. power draw) in response to the request; and generating and transmitting the response to the energy generation facility in dependence on whether an increase in energy consumption was achieved and/or in dependence on an amount of the achieved increase, the response optionally specifying the amount of the achieved increase (e.g. as a value specifying an achieved increase in power draw). The method may include, after the attempting step, measuring energy consumption using an energy meter (e.g. a power meter) installed at the energy consumer.

The energy generation facility is preferably located at a first site and the energy consumer is located at a second site, the first and second sites preferably geographically separated from each other. Where there are multiple energy consumers these may each be located at respective second sites geographically separated from the first site and/or from each other. The (or each) geographical separation may be at least 1 km, preferably at least 5 km or at least 10 km. Thus, the claimed approach allows balancing of energy consumption and generator curtailment across multiple geographically remote locations.

The communications link may be a dedicated communications link provided only for interconnecting the first and second sites. The communications link may comprise a fibre optic link.

In preferred embodiments, the energy is electrical energy (i.e. conveyed as electricity) and the distribution network is an electricity distribution network. Energy consumption and output are preferably considered and controlled in terms of power (energy per unit time), or more specifically electric power.

In a further aspect of the invention, there is provided a control system for an energy generation facility adapted to supply energy to an energy distribution network, the control system comprising: a communications interface for communicating via a communications link with an energy consumer; an export limiter for curtailing supply of energy from the energy generation facility to the distribution network; and a control device comprising: means for detecting a curtailment condition, the curtailment condition indicating that the energy generation facility should curtail its supply of energy to the energy distribution network; means for, in response to the curtailment condition, transmitting, via the communications link, a request to increase energy consumption to the energy consumer; means for receiving a reply message from the energy consumer via the communications link; and means for outputting control data to the export limiter to control energy output from the generation facility in dependence on the reply message. The system and/or control device preferably further comprises means for performing any method as set out in relation to the first aspect of the invention above or any method as described below.

The invention further provides a system, apparatus or control device having means, optionally in the form of one or more processors with associated memory, for performing any method as set out herein.

The invention also provides a computer readable medium comprising software code adapted, when executed on a data processing apparatus, to perform any method as set out herein.

Any feature in one aspect of the invention may be applied to other aspects of the invention, in any appropriate combination. In particular, method aspects may be applied to apparatus and computer program aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which:—

FIG. 1 provides a schematic illustration of an energy distribution network;

Figure 4:
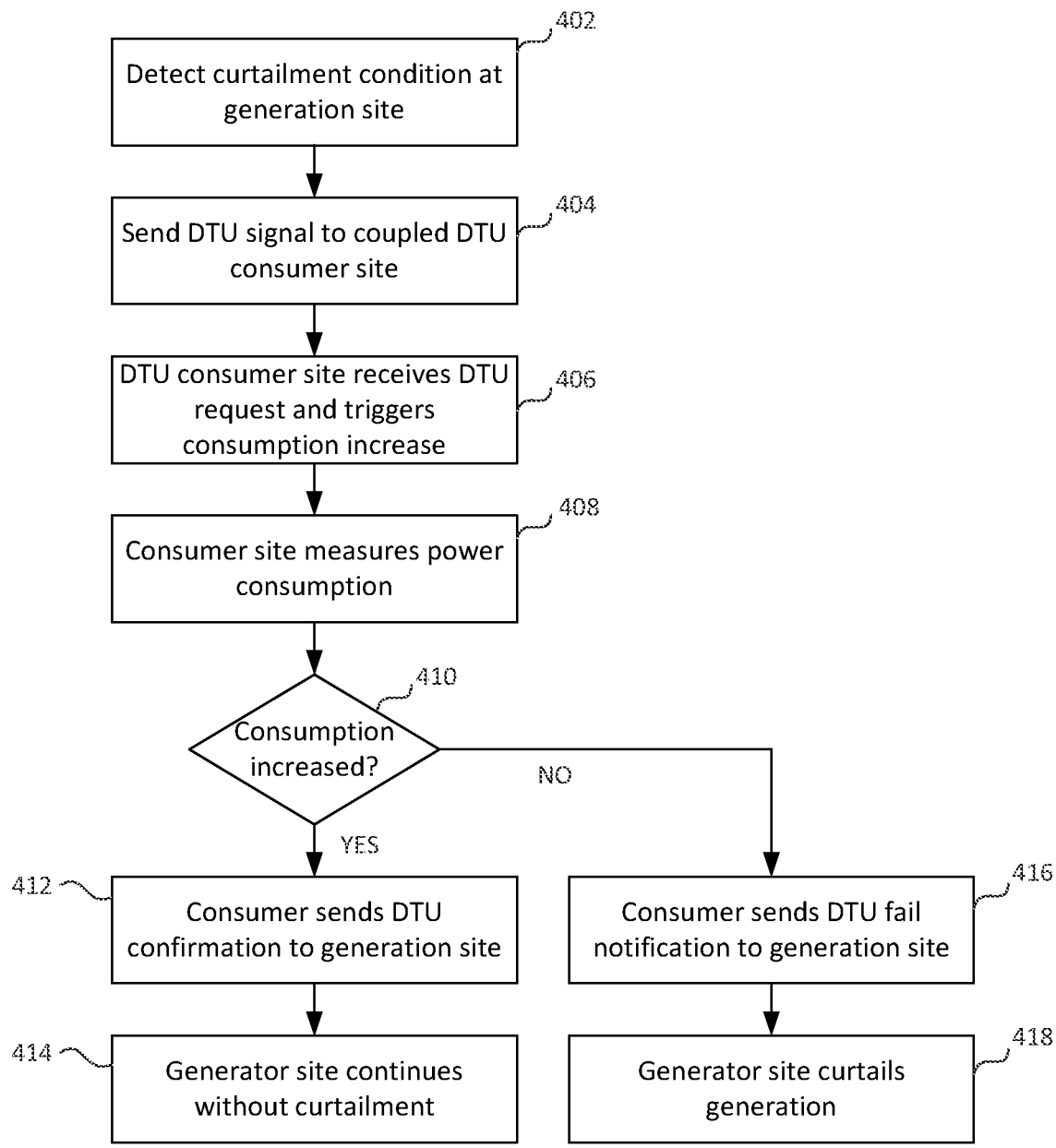
Figure 5A:
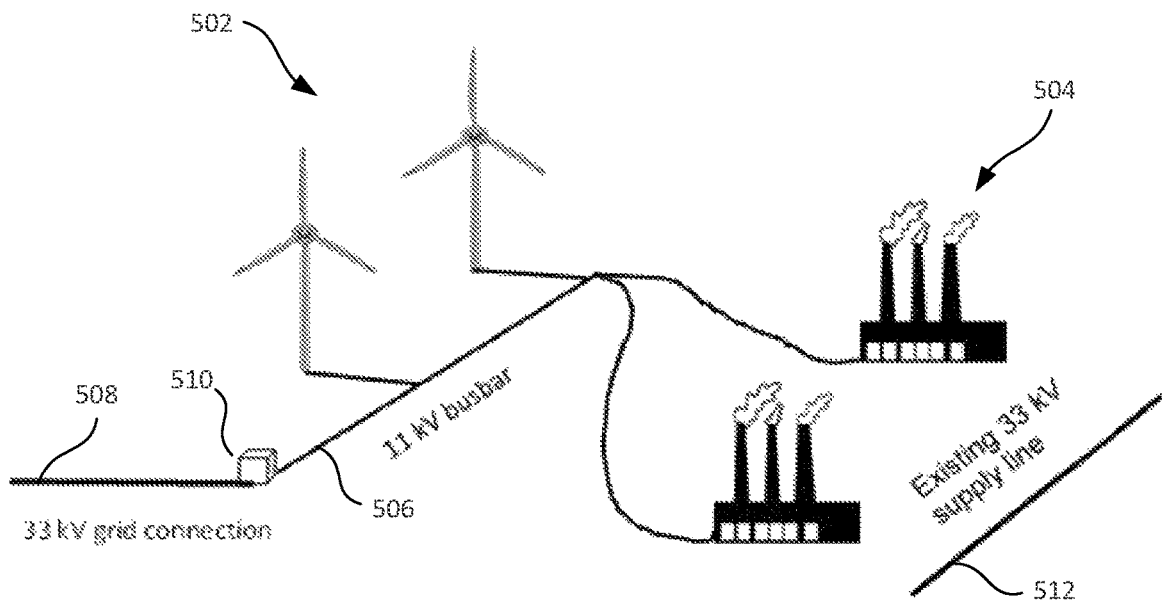
Figure 5B:
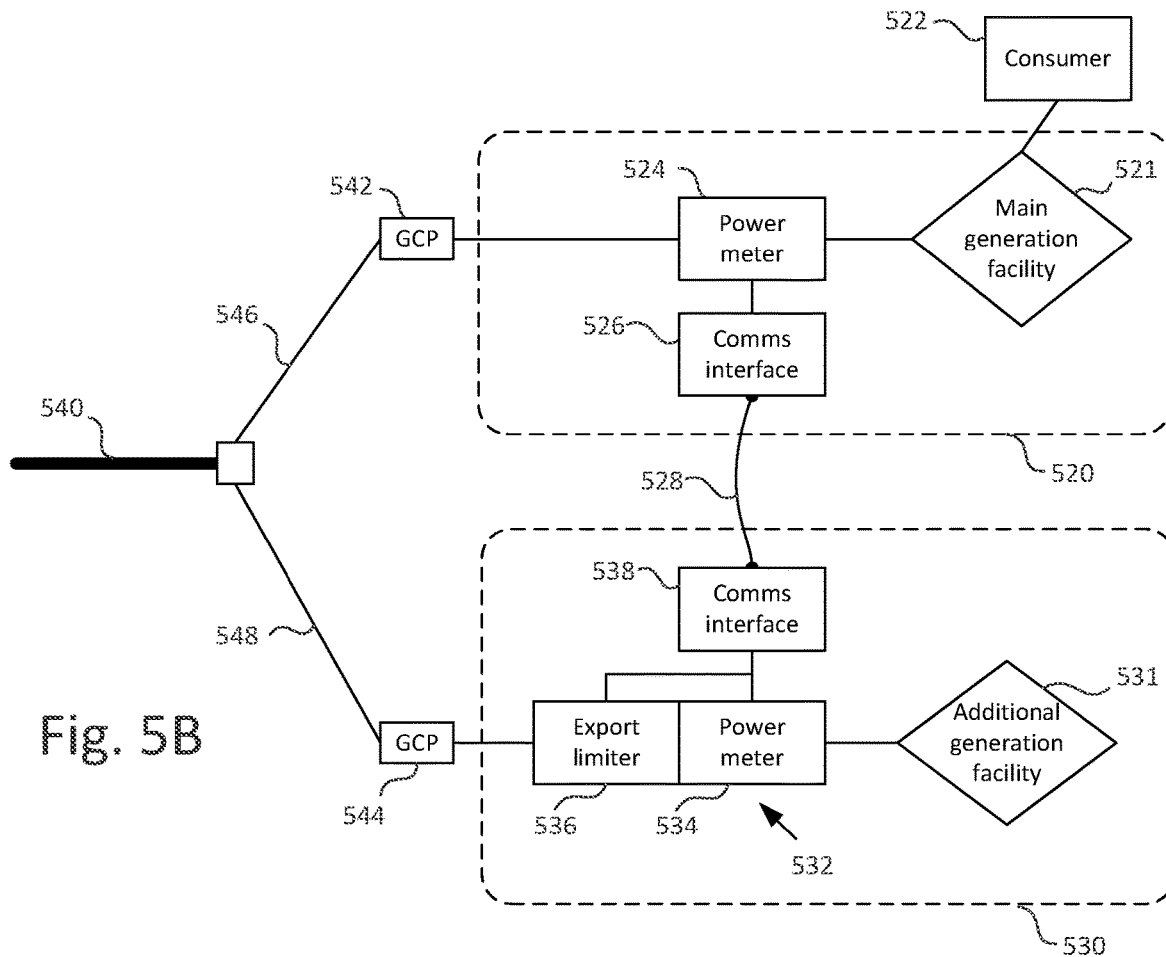
Figure 5C:
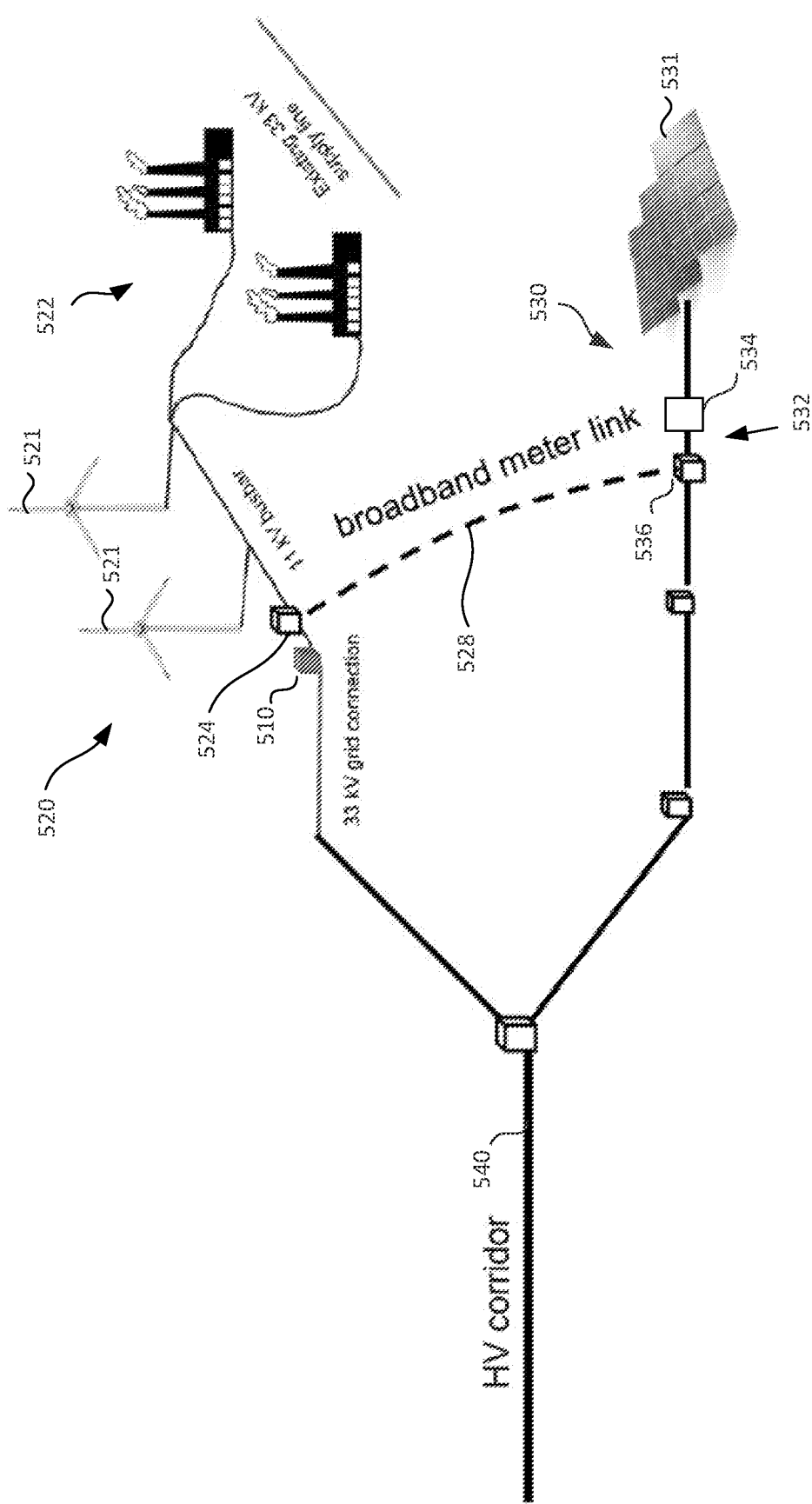
Figure 6:
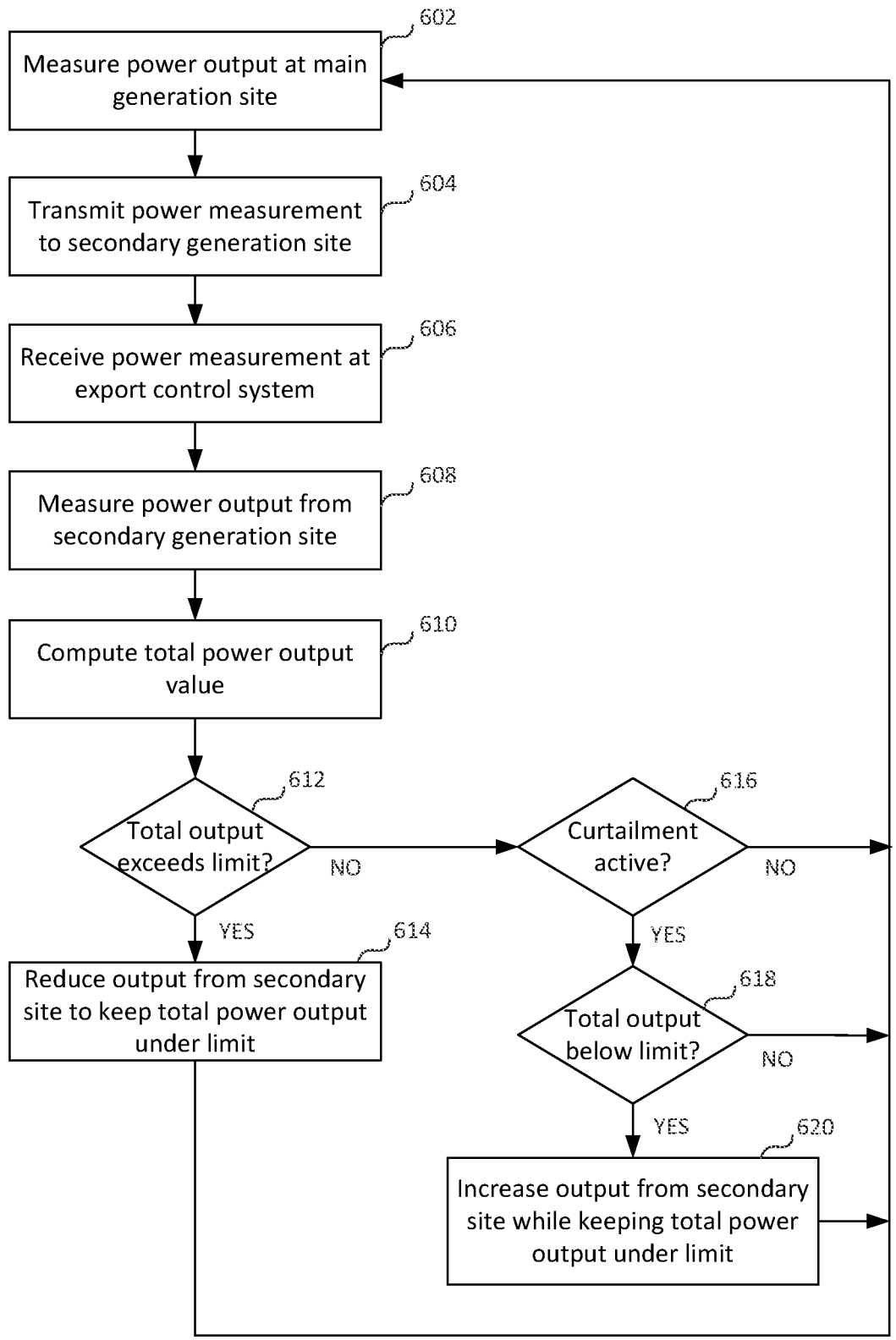
Figure 7:
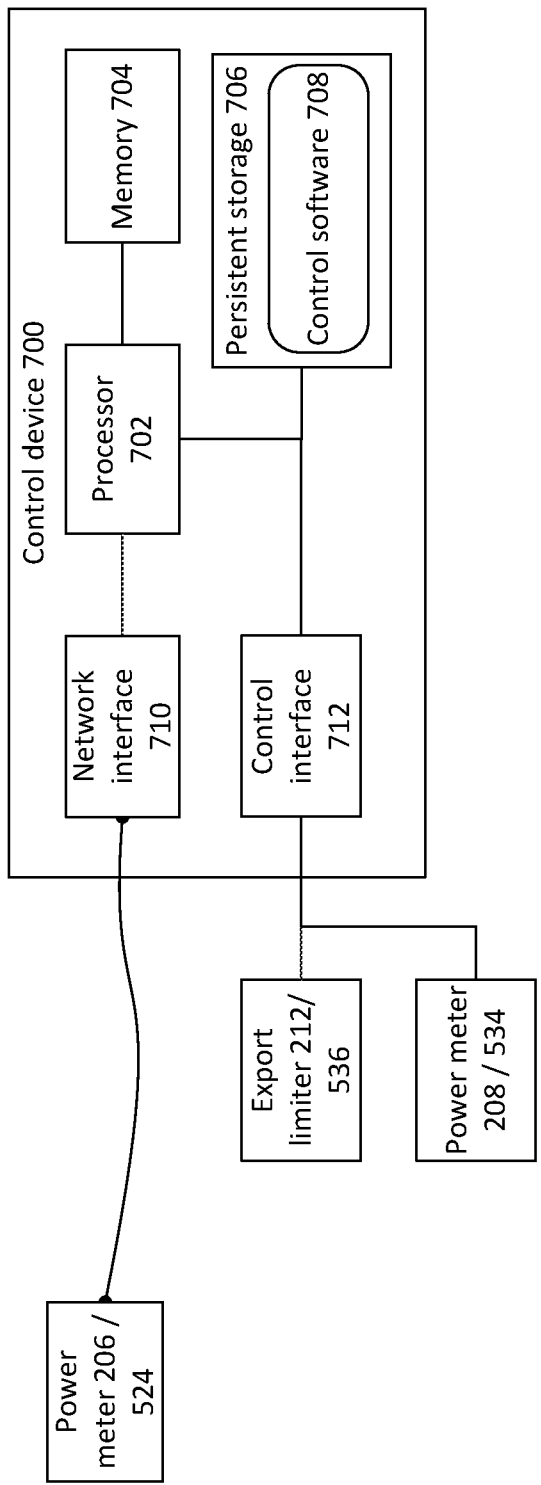

FIG. 4 summarises a process for balancing energy generation capacity with energy demands;

FIGS. 5A-5C illustrate a system for limiting energy export from multiple interconnected generation sites;

FIG. 6 illustrates a process for limiting energy export from multiple interconnected generation sites; and FIG. 7 illustrates a control device suitable for implementing described control processes.

OVERVIEW

Embodiments of the invention seek to smooth energy flows on the distribution network so as to achieve net increase in renewable energy provided into the network, and also to facilitate export of energy from a region/distribution network operator (DNO) without unduly impacting the high-voltage connections between areas/regions.

Figure 1:
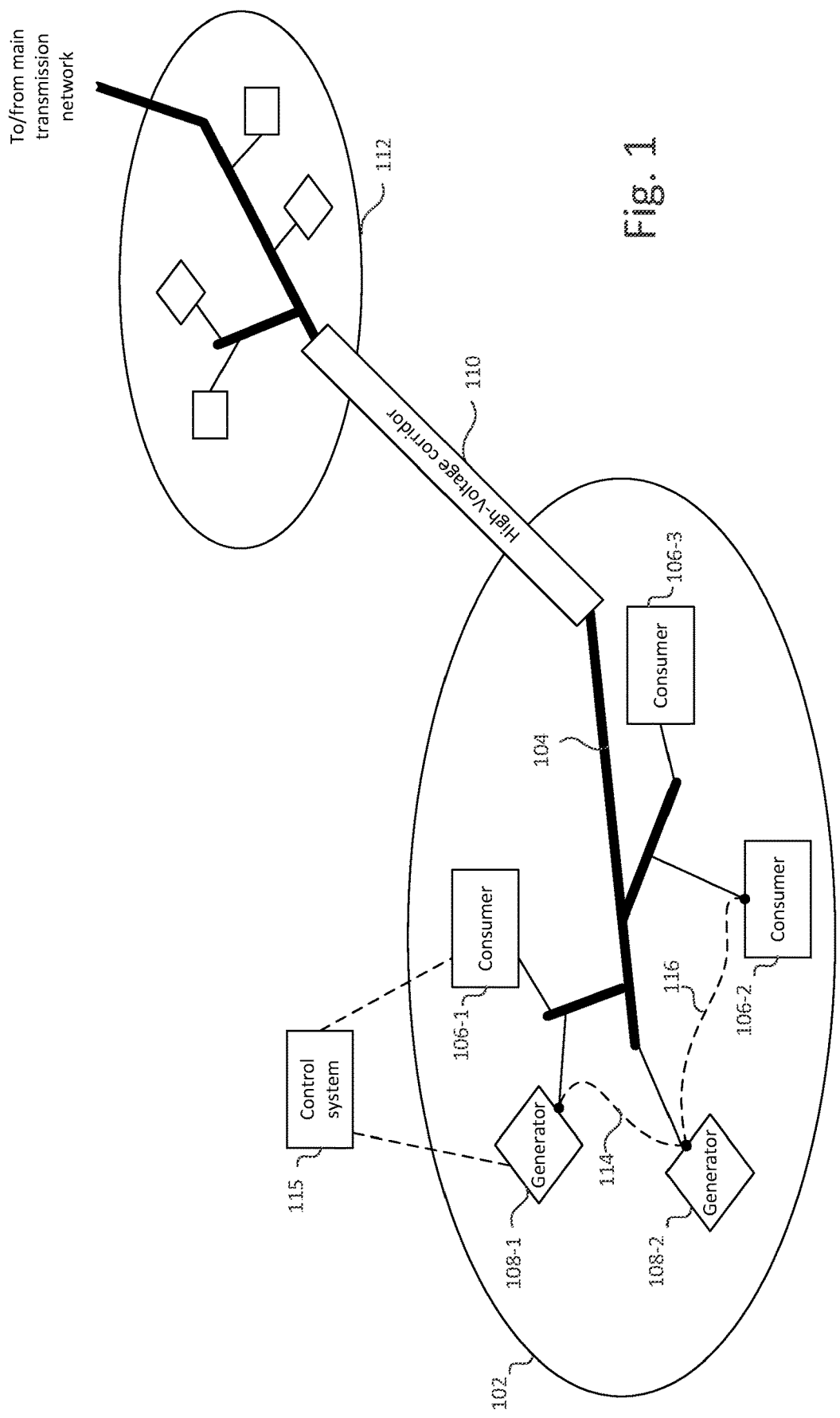

An energy distribution network is illustrated schematically in FIG. 1. In the described examples the energy distribution network is an electricity distribution network and thus the energy is distributed as electrical energy. However, the described techniques may also be applied to the distribution of energy in other forms, e.g. in the form of natural gas or other combustible fuels or materials.

The network comprises an energy distribution region 102, which is served by a particular DNO. The network comprises a (regional) distribution grid 104 to which various energy consumers 106-1, 106-2, 106-3 etc. and energy generators 108-1, 108-2 etc. are connected. Energy consumers 106 may represent individual consumers e.g. houses/buildings/factories or larger consuming entities such as industrial parks or housing estates. Generators 108 may represent any form of energy generation site or facility that is able to generate electrical energy (i.e. electricity) and supply it to the grid. Typically, generators 108 represent smaller-scale generation facilities, especially those based on renewable energy sources, such as wind turbines, solar energy generation facilities, and the like. These serve to supply additional energy to the grid beyond the main energy production by large-scale facilities, such as nuclear and coal-fired power stations which supply energy directly to the national high-voltage transmission network. Surplus energy generation capacity can be accommodated by exporting energy from region 102 to other regions such as region 112 (which may or may not be part of the same DNO grid, and contains further consumers and generators) via the high-voltage corridor 110.

The DNO may additionally comprise a control system 115 connected to generator and consumer sites via communications links to implement energy grid management functions such as generation curtailment and demand turn-up, as will be described in more detail below (only two connections are shown for clarity but the control system may be connected to any or all of the consumers and/or generators). While a single control system is shown, its functions may in practice be divided across multiple control systems provided throughout the region.

Additionally, embodiments of the present invention provide direct communication links between generator and/or consumer sites, for example connection 114 between generators 108-1 and 108-2 and connection 116 between generator 108-2 and consumer 106-2 to implement additional energy supply management functions as described further below.

It should be noted that the arrangement shown in FIG. 1 is purely by way of example, and generators, consumers, regional distribution networks, transmission networks etc. may be arranged in any appropriate manner. Embodiments of the invention described herein provide approaches to controlling energy output from generators in order to prevent overloading some part of the network. In a typical example, the part of the network being protected is a connection between regions that allows export of energy between regions, such as the high-voltage corridor 110 as depicted in FIG. 1. Note that a medium-voltage corridor or any other type of connection or subnetwork could similarly serve as the export corridor; the term "export corridor" as used herein thus refers to any portion or segment of the network which is used to transmit energy generated by the generators 102 and which is associated with some capacity limit or other restriction meaning that energy flowing through that part of the network should be controlled and/or restricted. More generally, the approaches described throughout this specification may be applied to protect any part of the network, through which flow of energy from one or more generators is to be controlled and/or restricted. For example, in addition to the export corridor (e.g. 110) the described approaches may be used to protect the regional distribution network 104 or any specific part of it or any connection into or out of it.

In response to the global shift of focus from centralized generation to a distributed model where energy is generated and managed closer to the point of demand, the creation of regional virtual energy marketplaces has recently been proposed, also referred to as local energy markets (LEMs). An example of this is the LEM established in Cornwall, England, in which participants use smart technologies to connect to a virtual marketplace implemented by an LEM software platform that allows operators of small-scale generation facilities to sell their flexible energy capacity to the grid and the wholesale energy market. This approach involves use of battery storage, and flexible demand and generation to reduce pressure on the electricity grid, avoid expensive network upgrades and provide a positive environmental impact by, for example, supporting de-carbonization.

A local energy market can allow operators of local generators to sell services, such as generation capacity and short-term-operating reserves. Embodiments of the invention seek to support such programs by allowing more direct interaction between consumers and generators to enable balancing of generation capacity and local energy demands.

Coupling Generation Curtailment and Demand Turn-Up

One recently proposed feature for use in smart energy distribution grids is referred to as "Demand Turn-Up" (DTU). DTU allows a consumer to be dynamically instructed to increase energy demand, which can allow excess generation capacity to be utilised more effectively, and reduce stress on the local distribution grid as well as the high-voltage corridor (e.g. by reducing excess energy being exported along the high-voltage or other export corridor).

As used herein, the term "demand" preferably refers to a measure of instantaneous energy consumption, typically measured as the rate of energy consumption. Thus, a demand is typically a measure of power consumed by a consumer, more particularly in the present examples, electric power, and is usually measured in Watt. The demand placed on the distribution grid by the consumer (that is, the rate of energy consumption from the grid) is thus distinct from the total cumulative energy consumed over some longer time period, and the demand from any particular consumer may vary over time. However, the present approaches may be applied regardless of whether energy consumption is measured as a demand (e.g. power) or in some other way. Thus, DTU typically refers to an increase in power draw by an energy consumer, but alternatively an energy consumption increase could be expressed in some other way, including an increase in cumulative energy consumption over a given time interval.

Similarly the term "energy output" or similar (e.g. of a generator) as used throughout this specification typically refers to output power, but again supplied energy may be measured and represented in any appropriate manner.

In one approach, DTU can be provided as a flexibility service that is procured via the LEM platform, and is called for at the Bulk Supply Points (BSPs). This allows DTU to be used as a high level action to manage reverse power flow; a measure of final control rather than an active mechanism to facilitate any specific export connection. In this scenario, the LEM buys DTU from the small individual consuming assets and loads and sells the aggregated DTU to the DNO (or facilitates such trading). However, this approach might not bring much direct advantage to generators.

Another feature proposed to manage energy flows in the grid is dynamic curtailment of generators. Here, an operator of a generation site accepts a curtailment agreement specifying that energy output from the site can be curtailed at the request of the DNO. To achieve this, an export limiter is installed at the generator site, which responds to a signal (transmitted typically by optical fibre) from a DNO control system (e.g. control system 115 of FIG. 1) to reduce output power—typically by ramping down the inverters coupling the generators at the site to the distribution network.

However, curtailment, aside from making energy generation less attractive financially, reduces the contribution by local energy generation sites, which are typically based on renewable energy, and thus negatively impacts on greenhouse gas reduction initiatives.

DNOs currently provide various approaches to curtailment that are intended to facilitate generation projects by avoiding expensive network reinforcement work. Examples include:

Export limiting—Hardware/software/communication solution to monitor and ramp down export within a time limit (currently typically 6 seconds) according to network stress.

Timed capacity—Generator is issued with a fixed daily curtailment schedule.

Soft intertrip—Coarse method of curtailment linked to headroom at a single upstream network asset.

Active Network Management (ANM)—Flexible and somewhat unpredictable curtailment via dynamic control system and according to the 'Last in First Off' (LIFO) ranking list.

Embodiments of the present invention address drawbacks of prior approaches by allowing a renewable energy generator having curtailed export to be coupled to a specific DTU consumer asset to achieve part or full mitigation of the curtailment. In effect this scheme can mimic a net metering solution whereby the DTU balances the export that would otherwise have been curtailed at the curtailed generator. In reality the net metering is achieved virtually via a high-speed communications link. A real-time meter is added at the DTU asset in addition to the meter in place at the generator connection. The communications link is used to exchange DTU requests and consumption information between the sites.

Figure 2:
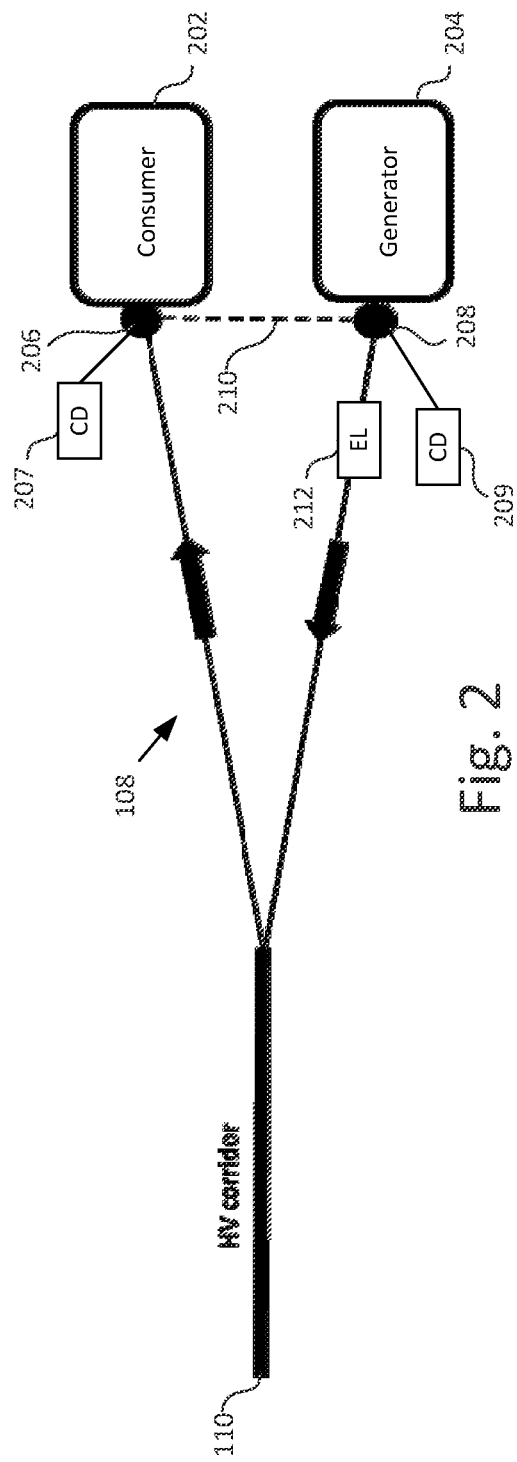
FIG. 2 illustrates a system for balancing energy generation capacity with energy demands.

A schematic illustration of the system is provided in FIG. 2.

Here an energy consumer 202—which may be any kind of energy consuming facility or entity, e.g. a factory or industrial estate—draws energy from the grid. The energy is sourced from the High-Voltage corridor 110 and delivered via the distribution grid 108. A generation facility 204 generates energy which is supplied via the grid 108 for export onto the high-voltage corridor 110. Generation facility 204 is associated with a curtailment agreement, implemented using an export limiter 212, which implements curtailment in response to a control signal from a control system associated with the DNO or in response to a pre-agreed curtailment schedule (as described above), or based on some other predefined curtailment condition. The consumer 202 is adapted to provide DTU, i.e. it can dynamically increase its energy demand in response to an external request.

The DTU-enabled consumer 202 is provided with a power meter 206 measuring power consumed by the consumer—i.e. the demand from the consumer. Curtailed generator 204 is similarly provided with a power meter 208 measuring the power output of the generator. The two sites are linked by a communications link 210. A control device 207, 209 may be provided at each site to receive data from the respective power meter and implement communication over the communication link. Alternatively, necessary computer/communications functions may be integrated into the power meters.

In this arrangement, when curtailment is activated at the generation site 204 (in response to detection of the curtailment condition), the control device 209 controls the export limiter 212 to reduce power output from the site, typically by ramping down the inverters coupling the generation output to the distribution grid 108.

However, prior to activating curtailment, the generation site 204 sends a signal via communications link 210 to the coupled consumer site 202 to request DTU, i.e. to request that consumer 202 increase its demand. Consumer 202 attempts to increase its demand (i.e. power consumption) in response to the signal to avoid the need for curtailment at the generator 204.

The process is illustrated in more detail in FIG. 4.

In step 402, a curtailment condition is detected at the generation site 204, indicating that the generation site should start curtailing its energy output. For example, this could be in response to a remote signal (e.g. from control system 115; FIG. 1), based on a curtailment schedule (e.g. due to the current time falling in a curtailment period specified in the schedule) etc. In step 404, the generation site 204 sends a DTU signal to the consumer site 202. The signal is received at the consumer site in step 406, and the consumer site attempts to increase its demand accordingly. In step 408, the consumer site measures the local power consumption to determine whether demand has indeed increased in accordance with the DTU request (410). If the demand has been successfully increased, then the consumer site sends a DTU confirmation signal to the generator site in step 412. In step 414, the generator site receives the confirmation signal, and as a result continues power output without implementing curtailment, i.e. at the same (or substantially similar) level of output compared to the output level immediately prior to the identification of the curtailment condition.

If on the other hand, the consumer site was unable to increase its demand, it sends a failure notification in step 416. In step 418, the generator site responds by curtailing energy generation in accordance with the curtailment agreement. Note that steps 416-418 may be performed not only in response to a failure notification, but also if no confirmation message is received in a given time limit, to ensure that curtailment is implemented in a timely fashion so as to comply with the curtailment agreement and avoid overloading the network (e.g. in one real-world example, a typical time limit for implementing curtailment may be around 5-10 seconds, typically 6 seconds).

Curtailment may be implemented in a binary fashion—i.e. the generator site either operates at full capacity or generates no output, or alternatively switches between full output and a predefined lower output level. Alternatively, curtailment may allow for a number of different levels of output from the generating site, with generation stepped down incrementally depending on the situation in the network. The DTU may similarly involve a fixed demand increase or a dynamically chosen variable increase. In one example, feedback may be implemented to allow the system to adapt to the specific conditions in the network and the demand variation achievable by the consumption site.

In such an example, the FIG. 4 process can be varied such that, after sending the DTU request to increase demand in step 404, the consumer site takes steps to increase demand and measures the increase in power consumption in step 408, with the confirmation sent in step 412 specifying the increase in demand that was achieved (e.g. by returning a consumption value specifying the new power consumption level or the consumption difference). In step 414, the generator then implements curtailment as appropriate depending on the achieved demand increase—in particular by reducing the generation output by an amount dependent on (or corresponding to) the demand increase. As a further variation, the DTU request sent in step 404 could specify a specific desired amount of demand increase, which the consumer site then attempts to implement. The DTU may be assessed against a predetermined and agreed normal operating demand level or demand profile of the consumer site (such a demand profile may specify variations in demand levels over time, e.g. by defining demand levels applicable at different time periods).

Figure 3A:
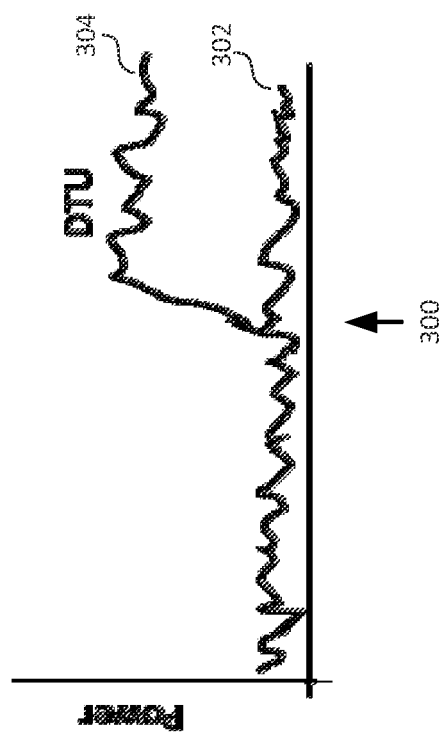
FIGS. 3A-3B illustrate effects of balancing demand and generation capacity.
Figure 3B:
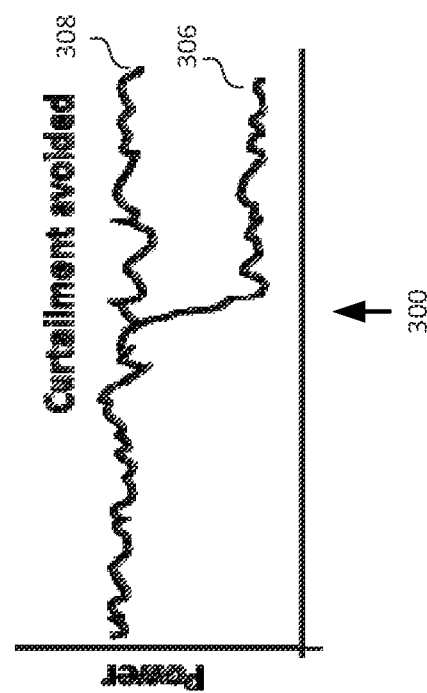

FIGS. 3A-3B illustrate the effects of directly coupling curtailment at one site to DTU requested at another site. In FIG. 3A, graph 302 shows power consumption at the consumer site at a steady rate without DTU. Graph 304 shows the divergence from the steady-state consumption after activation of DTU at time 300. FIG. 3B shows the power output at the generator site. Here, the lower graph 306 shows the power output with activation of curtailment at time point 300, when the curtailment conditions were first met. Upper graph 308 shows the continued power output at the preceding steady-state level where curtailment has been avoided, due to successful demand turn-up at the coupled consumer site. Thus in this example, the generator can continue to work at full output levels.

After the initial determination as to whether the DTU request was successful, and initiation of curtailment (or not) as appropriate, the generator site preferably continues to receive messages from the consumer site providing updated demand data, for example at intervals or in response to the demand changing significantly. For example, the consumer may send a message indicating that it is no longer able to maintained increased demand to the level required by an earlier DTU request.

In response to updated information from the consumer, the control device at the generator site may re-evaluate whether curtailment should be started, stopped or modified. For example, if the curtailment condition still exists but output is continuing without curtailment due to a successful DTU request, and demand at the consumption site subsequently falls, the control device may start curtailing output from the generation site using the same principles outlined above. As another example, if an initial DTU request was unsuccessful but the consumer is subsequently able to increase demand then a prior curtailment may be reduced or ended. If an initial request was unsuccessful, the generation site may continue to send DTU requests at intervals while the curtailment condition holds true.

The consumer site 202 and generator site 204 may be geographically remote from each other (for example the geographical separation may be 1 km or more, 5 km or more or even 10 km or more). The communications link 210 is preferably a dedicated communications link, such as a fibre optic link, and may be a standalone link (serving only the two sites) or form part of a control network. In some cases, the communications link could include pre-existing and/or public wired or wireless networks, such as the Internet and/or wireless/mobile telecommunications networks, as long as the connection provides sufficient transmission bandwidth and reliability and sufficiently low latency to meet the required response times.

In this scenario, the LEM can facilitate the trade of flexibility between the two parties forming the couple. By providing this facility for directly coupling DTU at a consumer to curtailment at a generator, generator operators may be encouraged to accept otherwise unattractive connections. The connection agreement at the generator site may need to be amended to reflect the virtual net metering and the DNO may typically wish to approve the failsafe operation of the scheme to ensure that any failure does not cause overload or damage in the distribution network. The system is thus preferably arranged to implement curtailment at the generator as normal in the event of any failure, for example upon failure of the communications link.

Example scenarios in which the above approach can be utilised include Combined Heat and Power (CHP) installations. A CHP site as an energy consumer can be configured to implement DTU by turning down local energy production so that the site draws more power from the distribution network, thereby increasing its network-sourced consumption. Thus, the site's overall energy consumption is maintained at a given level, but the amount of power demanded by the site from the distribution network is increased. CHP is commonly embedded in user sites and is routinely used where there are industrial heat and power loads. Another example is where an industrial installation can utilise alternative power sources (e.g. both an electrically fired steam generator and a gas fired steam generator are available), and can switch to electrical generation in response to a DTU request to increase the demand placed on the electricity grid and reduce consumption of gas or other fuel (thereby again improving overall renewable utilisation).

Thus, aside from the advantage to the generator operator that the generator can carry on generating, the described system allows utilisation of environmentally unfriendly generators to be reduced in favour of environmentally friendly ones.

In the above examples, the curtailed generation facility is coupled to a single DTU-enabled consumer facility. However, the generation facility could be coupled to multiple different DTU-enabled consumer facilities in the same manner. For example, different DTU-enabled consumer facilities may be able to achieve different levels of demand increase, and the generator facility can select to send a DTU request to a particular generator depending on the amount of demand increase that is required to avoid (or reduce) curtailment.

In another example, the generator facility may send requests to multiple DTU-enabled consumer facilities to achieve the required demand increase—for example:

DTU may be requested from two or more consumer facilities to achieve an aggregate demand increase matching a total required demand increase (e.g. where the generator facility is aware that the DTU available from each site individually is insufficient to meet the DTU requirement).

DTU may be requested from a first consumer facility, and, in response to a notification that the first consumer facility is not able to increase demand, a DTU request may then be sent to a second consumer facility.

DTU may be requested from a first consumer facility, and in response to a notification that the first consumer facility has increased its demand, but by an amount less than a total required DTU amount, the generator may then send a DTU request to a second consumer facility in relation to the remaining amount of DTU required.

DTU requests could be sent simultaneously to multiple consumer sites, which each send responses indicating an amount of DTU achievable at the site. The generator could then dynamically select one or more DTU sites from which to request DTU to achieve (possibly in aggregate) the required DTU amount.

The above examples may be extended to any number of DTU-enabled consumers.

Similarly, a given DTU-enabled consumer may be coupled to multiple curtailed generator facilities and may receive and act upon DTU requests from multiple generator facilities, e.g. providing DTU for multiple coupled generators at the same time if capacity allows and/or resolving conflicting DTU requests (for example on a first-come-first-served or priority basis).

Managing Multiple Generation Sites Using Combined Output Limits

In many distribution networks, there may be opportunities to connect renewable energy generators directly to industrial and commercial loads by private wire. Such arrangements fit well with the principles of LEMs, enabling the local supply and purchase of electricity at advantageous rates via the local energy market. Another important benefit of private wire systems, or microgrids, is that they reduce both the local generation being exported onto the distribution network and the demand being placed on the network. This can release capacity on the network for both increased distributed generation and increased demand.

The following describes a LEM scenario which illustrates the unlocking of generation capacity on the network and the resulting enablement of a new renewable energy installation.

The scenario is illustrated in FIG. 5A. In this example, an existing 3.0 MW wind turbine cluster 502 (consisting of multiple wind turbines) is connected to the 33 kV distribution network 508. The wind turbine cluster is also directly connected to industrial demand on the adjacent industrial estate 504, here consisting of two factories. The connection is by way of a new 11 kV private wire busbar 506 installed between the generation site (wind turbine cluster) and the consumption site (industrial estate). This becomes the only power feed to the two factories at site 504 (previously directly connected to the distribution grid by existing supply line 512). The factories at site 504 will therefore draw all of their power from the busbar 506. The busbar will be fed by both the wind turbines and a single grid connection 508 via a 33/11 kV transformer 510. Thus, excess energy demands at site 504 not met by the wind turbine cluster 502 are instead met by grid connection 508. Similarly, excess energy output from wind turbine cluster 502 is supplied to the grid via grid connection 508.

To ensure that the distribution grid is not overloaded, it may be necessary to ensure that the energy supplied into the grid is within defined limits, both in terms of total energy over a time period and in terms of the instantaneous power supplied into the grid. Here, it is assumed that the maximum power output to the distribution network permitted is 3.0 MW, matching the capacity of the wind turbine cluster 502.

In this example, it is assumed that probabilistic modelling of the energy flows predicts that, over time, 95% of the wind energy generated will flow directly to the two factories at site 504 with just 5% being exported onto the distribution network. The Local Energy Market administers or facilitates the trading to and from the busbar on behalf of the buyers and sellers. This private wire installation provides a number of benefits to the distribution grid, including:

A substantial amount of export onto the grid from the wind turbine cluster 502 is eliminated. This relieves network stress, particularly on the HV (high voltage) or other export corridor which serves to export generation from the local region to other regions at times of peak renewable energy generation.

Prior to the private wire installation, the industrial estate is drawing a maximum demand through the existing (and separate) 33 kV supply line 512. Removing the two factory loads from this line will release further demand headroom for industrial growth on the estate.

The private wire installation can also reduce the energy cost to consumer (factories) and increase energy price achieved by the operator of the generation asset.

Thus, most of the time, all or a large proportion of the 3.0 MW output of wind turbine cluster 502 is used by consumption site 504. The relief of reverse power flow stress on the HV corridor can be used to enable another renewable energy generator to export onto the distribution grid. In the present example scenario, this could e.g. involve installation of a 1.5 MW generation asset at another site.

However, while the modelling indicates that, over time, 95% of the wind energy will be used by the factories, it is also necessary to ensure that the instantaneous power output onto the grid at any given time does not exceed the 3.0 MW limit. This could occur, e.g., at time when the factories are drawing less power (e.g. during shutdown). To remain within the calculated export headroom on the export corridor (e.g. the HV corridor), the aggregated export of the existing 3.0 MW wind turbine cluster 502 and the proposed additional 1.5 MW generation asset will need to remain below 3.0 MW at all times. This can be achieved by curtailing output from the additional generation asset dynamically as needed.

In this example scenario, the probabilistic modelling predicts that by curtailing export of just 30,000 kWh per year from the new installation, the aggregated limit of 3.0 MW will be achieved. This curtailment represents just 0.7% of the output for a 1.5 MW wind turbine or 2% for photovoltaic, i.e. solar, energy generation. In either case the amount of curtailment can be largely predictable and does not significantly impact on the commercial viability of such a project.

In embodiments of the invention, the curtailment is achieved via a net metering solution with broadband communications link and an export limiting device at the secondary generation site.

The system is illustrated schematically in FIG. 5B.

Here, a main generation facility 521 (e.g. corresponding to the wind turbine cluster 502 of FIG. 5A) is provided at the main generation site 520 and is connected directly via private wire connection to a consumer 522 (e.g. corresponding to the industrial site 504 of FIG. 5A). The consumer consumes most of the energy output by the generation facility 521, but the instantaneous power output from the generation facility 521 to the distribution grid can fluctuate over time and may be at maximum output capacity for short times.

The maximum output may e.g. be specified by an export agreement. Such an export agreement is in itself a valuable commodity and thus it is desirable to retain and utilise the available export capacity as fully as possible. Since for a large proportion of the time the export capacity is not utilised (the energy output being consumed by consumer site 522), an additional generation facility 531 is installed at a secondary generation site 530. To prevent overloading of the grid and potential system damage the instantaneous power output from both sites should not exceed the specified aggregate limit for more than a short time period (typically of order of a few seconds).

To ensure the addition of the new generation site does not result in exceeding the export limit, the new generation facility 531 is provided with an export control system 532. This comprises a real-time power meter 534 that monitors output of the new generation asset, and an export limiter 536 which ramps down the inverters coupling the generation facility to the distribution network if necessary.

The main generation facility 521 is provided with a power meter 524, which measures the power output from facility 521 to the distribution grid and transmits the power measurements to the export control system 532 at the secondary generation site 530. Power measurements are obtained by meter 524 and transmitted to control system 532 essentially continuously (this means in practice that measurements are taken and transmitted repeatedly at a sufficiently high data capture rate so that data is available on a substantially continuous basis, e.g. a rate of around 20 Hz or higher may be used). Transmission occurs via respective communications interfaces 526 and 538 and a communication link 528 between the sites. In one example this may be a dedicated fibre optic communication link between the sites. However, any network connection (including connections involving pre-existing networks such as the public Internet, mobile/wireless communications networks and the like) may be used as long as the connection provides adequate bandwidth, reliability and sufficiently low latency to transmit the power meter data reliably at a sufficient data rate.

The export control system 532 at secondary generation site 530 receives the power measurements from main site 520 and at the same time measures the output power at site 530 using power meter 534. The export control system then computes the total export power as the sum of the two power output values (output power measured at power meter 524 at main site 520 and at power meter 534 at secondary site 530) and compares the total exported power to the combined output limit. If the total power exceeds the output limit (or in one embodiment, if it approaches the output limit to within a defined safety margin), then the export limiter 536 is activated to limit the power output from site 530. The system may be configured to reduce output by an amount corresponding to the amount by which the combined power output exceeds the output limit, or may alternatively reduce output by a larger amount, incorporating a safety margin.

Subsequently, the export control system continues to monitor the power output reported by the main generation site 520. If the total combined power output of both sites falls sufficiently far below the combined export limit, then the control system adjusts or ends operation of export limiter 536 to increase the power output from the secondary site 530, e.g. to full output if possible or to an intermediary output level, such that the new combined output level remains within the combined limit.

Control in this fashion preferably continues on a continuous, real-time basis, with the power output from secondary site 530 regulated based on the instantaneous power output measured at the main site 520 so that the aggregate power output remains within the limit. The control system 532 is preferably configured to respond to changing output conditions within a specified time limit. In a typical example, the system may allow e.g. one second for communication of power data from site 520 to site 530 and e.g. five seconds for ramping down of the inverters by the export limiter, i.e. a total response time of six seconds. In practice, the required response time is set based on the characteristics of the distribution network and the need to avoid overload or damage in the network.

The described approach thus allows additional generation capacity to be provided to exploit the fact that most of the power output from main generation site 521 is consumed by consumer 522 via the private wire connection, whilst at the same time helping to prevent overload in the export corridor 540 (and also in the distribution network 546, 548 connecting the sites to the export corridor).

The generation facilities 521, 531 are connected to the distribution network at different grid connection points 542, 544, located on separate distribution feeders 546, 548. The grid connection points may, for example, correspond to connection points associated with respective different MPANs (Meter Point Administration Numbers) or S-Numbers (Supply Numbers). The sites 520, 530 are typically geographically remote from each other—in typical scenarios the sites may be geographically separated by a distance of at least 1 km, preferably at least 5 km or even at least 10 km. Due to the geographical separation of the sites and the connection to different distribution feeders, it is typically not possible to provide a single power meter measuring an aggregate power for the sites, and in the described embodiments, power meters 524 and 534 are separate, with measured power data exchanged between the sites via communications link 528.

While FIG. 5B shows the generation sites as being connected to separate distribution feeders, in principle the described techniques could apply to any limbs of the network, where a known export constraint is to be applied across two sites or facilities connected at those network limbs.

An example of the implementation of the described system in the context of the FIG. 5A scenario is illustrated in FIG. 5C. Here, the primary site 520 and consumer site 522 correspond to the generation and consumer facilities depicted in FIG. 5A. Additionally, a geographically remote secondary generation site 530 has been added with a solar generation facility 531 as the generation facility. Power monitor 524 at the main site 520 and export control system 532 including power meter 534 and export limiter 536 at the secondary site 530 cooperate to ensure that the combined power output from the sites into the distribution grid and high-voltage corridor 540 remains within the aggregate export limit.

Thus, in this scenario, the energy generation facilities at the main and secondary generation sites generate electricity based on different energy sources—wind and solar respectively. This can allow different availability of the different energy sources to be exploited to improve overall output from the sites—especially for renewable energy sources which are typically highly variable. For example, energy output from the main generation facility (wind farm) may fall not just due to higher consumption but also due to low winds at a time when solar energy may be more readily available.

Thus, the described approach to coordinating export from multiple sites (when applied to generators using different energy sources), based on a combined export limit, can improve utilisation of the available export limit and thus also increase the contribution to energy supplied into the grid from renewable sources. In addition to wind and solar energy, the generation facilities may be based on other types of renewable energy sources, such as hydroelectric energy, geothermal energy, biomass energy etc. However, non-renewable energy sources may also be used.

The process for controlling energy output is summarised in FIG. 6. In step 602, the power output is measured at the main generation site. The power output may be measured as a numerical value using any suitable unit of measurement, e.g. MW. In step 604, the power measurement is transmitted to the secondary generation site via the communications link. Steps 602-604 are performed by the power monitor 524 and communications interface 526 at main site 520 repeatedly at a given measurement/transmission rate.

In step 606, the power measurement is received at the export control system 532 at secondary generation site 530. In step 608, the export control system measures the current power output from the secondary generation site and then computes a total power output value based on the sum of the main site and secondary site power output values in step 610. In step 612 the export control system determines whether the total power output for both sites exceeds the limit. Alternatively, the control system may determine whether the total power output is close to the limit, e.g. within a defined safety margin of the limit. If yes, then in step 614 curtailment is activated (or maintained if already active) and the export control system adjusts the output from the secondary site by an amount sufficient to reduce the total power output for both sites to a level less than (or at most equal to) the output limit. Alternatively, the export system may implement curtailment by completely disabling output from the secondary site, i.e. reducing output from the secondary site to zero. The process then continues back to step 602, where the power monitoring and output adjustment cycle is repeated.

If the total output does not exceed the limit at step 612, then at step 616, the export control system determines whether curtailment is already active. If not, then no further action is needed and the process continues with further monitoring at step 602. If curtailment is active (i.e. the power output from the secondary site has already been reduced), then the control system determines in step 618 whether the total output is now below the limit, typically by a sufficient margin to allow the output from the secondary site to be safely increased. If yes, then output is increased in step 620 by an amount that keeps the total combined power output under the limit (possibly to full output capacity), and the monitoring cycle then repeats at 602. If not (i.e. output is at or near limit, or not sufficiently under limit to be safely increased), then output is maintained at the present rate and the process continues with further monitoring at step 602.

Referring back to FIG. 5B, in the approach described above, the main site 520 reports power measurements to the secondary site 530, with the secondary site including the control system that computes the total combined power, compares it to the output limit, and controls the export limiter 536 as needed. However, alternative arrangements are possible. For example, the control process could be implemented in a control device at the main site 520. In that case, the secondary site 530 may transmit power measurements via communications link 528 to the main site 520, with a control device at main site 520 computing the total combined power output and comparing it to the combined output limit. The control device at main site 520 would then send control instructions or data back to the secondary site 530 via the communications link to control the export limiter (directly or via another control device). Furthermore, the described arrangements could also be modified such that it is the output from the main site that is limited instead of the output from the secondary site.

Furthermore, the described approach may be extended across multiple generator sites. For example, a generator site may receive output measurements from two (or more) other generator sites and adjust its own generation output so that the total from all three (or more) sites remains below a joint limit defined for all three (or more) sites.

Control Device

Various processes described herein may be performed at a computing device. Such a computing device is illustrated in FIG. 7, in the form of control device 700. The control device may be used e.g. as control device 209 in the FIG. 2 system or as part of export control system 532 in the FIG. 5B system.

The control device 700 includes one or more processors 702 together with volatile/random access memory 704 for storing temporary data and software code being executed.

Persistent storage 706 (e.g. in the form of hard disk storage, solid state storage, optical storage and the like) persistently stores control software 708 for performing the previously described control functions. The persistent storage also includes other software and data (not shown), such as an operating system for device 700.

A network interface 710 is provided for communication with external devices such as power meter 206/524 and/or other related components at site 202/520, e.g. for the receipt of output power measurements from that site, transmission of DTU requests etc.

A control interface 712 is provided for connection to export limiter 212/536 to allow control device 700 to transmit control commands to the export limiter and thereby effect curtailment of output from the generation site 204/530. The control interface additionally allows connection to power meter 208/534 to receive local power output measurements.

The control device will include other conventional hardware and software components as known to those skilled in the art, and the components are interconnected by a data bus (this may in practice consist of several distinct buses such as a memory bus and I/O bus).

While a specific architecture is shown by way of example, any appropriate hardware/software architecture may be employed for the control device.

Furthermore, functional components indicated as separate may be combined and vice versa. For example, separate control interfaces 712 may be provided for connection to export limiter 212/536 and power meter 208/534 respectively.

The control device 700 may be arranged by way of the control software 708 to perform any of the functions described above, including the processes (or parts thereof) depicted in FIGS. 4 and/or 6 and/or processing functions of control device 209 (FIG. 2) or export control system 532 (FIG. 5B).

It will be understood that the present invention has been described above purely by way of example, and modification of detail can be made within the scope of the invention.

The invention claimed is:

1. A method of controlling energy supply in an energy distribution network comprising an energy generation facility adapted to supply energy to the energy distribution network and an energy consumer adapted to consume energy from the energy distribution network, the method comprising, at the energy generation facility:

detecting a curtailment condition, the curtailment condition indicating that the energy generation facility should curtail its supply of energy to the energy distribution network;

in response to the curtailment condition, transmitting, via a communications link, a request to increase energy consumption to the energy consumer;

receiving a reply message from the energy consumer via the communications link; and controlling energy output from the generation facility to the energy distribution network in dependence on the reply message, wherein controlling energy output comprises continuing energy output without curtailment in response to the reply message indicating one of:

that the energy consumer has increased its energy consumption;

that the energy consumer has increased its energy consumption by at least a predetermined amount or an amount specified in the request.

2. A method according to claim 1, wherein curtailing energy output comprises one or more of: reducing an output power of the generation facility; continuing energy output at a lower output level compared to the energy output prior to detection of the curtailment condition; and terminating energy output to the distribution network.

3. A method according to claim 1, wherein curtailing energy output comprises sending control data to reduce energy output to an export limiter coupled between the generation facility and the distribution network.

4. A method according to claim 1, wherein the controlling step comprises determining whether, and to what extent, to curtail energy output from the generation facility in dependence on the reply message, and controlling energy output based on the determination.

5. A method according to claim 1, wherein continuing energy output without curtailment comprises continuing energy output substantially at a level corresponding to the output level immediately preceding detection of the curtailment condition.

6. A method according to claim 1, comprising curtailing energy output from the generation facility in response to the reply message indicating that the energy consumer has not increased its consumption, or has increased its consumption by less than a requested or expected increase.

7. A method according to claim 1, wherein the controlling step comprises curtailing energy output by an amount dependent on an increase in energy consumption achieved by the energy consumer.

8. A method according to claim 7, wherein the amount is specified in the reply message.

9. A method according to claim 1, wherein an increase in energy consumption is specified in the request and/or reply message with respect to a predetermined demand level or profile associated with the consumer.

10. A method according to claim 1, wherein the request is a request to increase power consumption by the consumer.

11. A method according to claim 1, wherein detecting the curtailment condition comprises receiving a curtailment request message from a control system associated with the energy distribution network.

12. A method according to claim 1, wherein detecting the curtailment condition comprises determining a time at which curtailment should be implemented based on a curtailment schedule.

13. A method according to claim 1, comprising, in response to the curtailment condition, transmitting requests to increase energy consumption to a plurality of energy consumers, wherein the controlling step comprises controlling energy output from the generation facility based on an aggregate consumption increase achieved by the plurality of energy consumers responsive to the requests.

14. A method according to claim 1, comprising, at the energy consumer:

receiving the request;

attempting to increase energy consumption in response to the request; and generating and transmitting the response to the energy generation facility in dependence on whether an increase in energy consumption was achieved and/or in dependence on an amount of the achieved increase, the response optionally specifying the amount of the achieved increase.

15. A method according to claim 1, wherein the energy generation facility is located at a first site and the energy consumer is located at a second site, geographically separated from the first site.

16. A method according to claim 1, wherein the communications link comprises one or more of: a dedicated communications link provided only for interconnecting the first and second sites; and a fibre optic link.

17. A method according to claim 1, wherein the energy is electrical energy and the distribution network is an electricity distribution network.

18. A control system for an energy generation facility adapted to supply energy to an energy distribution network, the control system comprising:

a communications interface for communicating via a communications link with an energy consumer;

an export limiter for curtailing supply of energy from the energy generation facility to the distribution network; and a control device configured to:

detect a curtailment condition, the curtailment condition indicating that the energy generation facility should curtail its supply of energy to the energy distribution network;

in response to the curtailment condition, transmit, via the communications link, a request to increase energy consumption to the energy consumer;

receive a reply message from the energy consumer via the communications link; and output control data to the export limiter to control energy output from the generation facility in dependence on the reply message, wherein controlling energy output comprises continuing energy output without curtailment in response to the reply message indicating one of:

that the energy consumer has increased its energy consumption;

that the energy consumer has increased its energy consumption by at least a predetermined amount or an amount specified in the request.

19. A non-transitory computer readable medium comprising software code adapted, when executed on a data processing apparatus, to perform operations for controlling energy supply in an energy distribution network comprising an energy generation facility adapted to supply energy to the energy distribution network and an energy consumer adapted to consume energy from the energy distribution network, the operations comprising:

detecting a curtailment condition, the curtailment condition indicating that the energy generation facility should curtail its supply of energy to the energy distribution network;

in response to the curtailment condition, transmitting, via a communications link, a request to increase energy consumption to the energy consumer;

receiving a reply message from the energy consumer via the communications link; and controlling energy output from the generation facility to the energy distribution network in dependence on the reply message, wherein controlling energy output comprises continuing energy output without curtailment in response to the reply message indicating one of:

that the energy consumer has increased its energy consumption;

that the energy consumer has increased its energy consumption by at least a predetermined amount or an amount specified in the request.

* * * * *